(12) United States Patent
Batten et al.

(10) Patent No.: US 6,256,725 B1
(45) Date of Patent: Jul. 3, 2001

(54) SHARED DATAPATH PROCESSOR UTILIZING STACK-BASED AND REGISTER-BASED STORAGE SPACES

(75) Inventors: Dean Batten, Allentown, PA (US); Paul Gerard D'Arcy, Alpharetta, GA (US); C. John Glossner, Allentown, PA (US); Sanjay Jinturkar, Bethlehem, PA (US); Jesse Thilo, Bethlehem, PA (US); Kent E. Wires, Bethlehem, PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/205,466

(22) Filed: Dec. 4, 1998

(51) Int. Cl.$^7$ .................................................. G06F 12/02
(52) U.S. Cl. .............................. 712/200; 711/5; 712/202
(58) Field of Search ................................. 711/5; 712/200, 712/202

(56) References Cited

U.S. PATENT DOCUMENTS

| | | | |
|---|---|---|---|
| 5,305,377 | 4/1994 | D'Arcy et al. | 379/399 |
| 5,386,376 | 1/1995 | Girard et al. | 708/656 |
| 5,481,693 | 1/1996 | Blomgren et al. | 712/225 |
| 5,659,785 | 8/1997 | Pechanek et al. | 712/11 |
| 5,764,687 | 6/1998 | Easton | 375/147 |
| 5,768,553 | 6/1998 | Tran | 712/208 |
| 5,845,307 | * 12/1998 | Drabhu et al. | 711/2 |
| 5,852,726 | * 12/1998 | Lin et al. | 712/200 |
| 6,041,387 | * 3/2000 | Fleek et al. | 711/5 |
| 6,088,786 | * 7/2000 | Feierbach et al. | 712/200 |

OTHER PUBLICATIONS

K. Kissell, "MISPS16: High Density MIPS for the Embedded Market," In Proceedings of the ACM SIGPLAN Workshop on Languages, Compilers and Tools for Real–Time Systems, Las Vegas, Nevada, Jun. 15, 1997.

C.J. Glossner and S. Vassiliadis, "The Delft–Java Engine: An Introduction," Lecture Notes in Computer Science, Springer–Verlag, Third International Euro–Par Conference (Euro–Par '97 Parallel Processing), pp. 766–770, Passau, Germany, Aug. 26–29, 1997.

ARM7TDMI Datasheet, Advanced RISC Machines, Ltd., UK, Document No. ARM DDI 0029E, Aug. 1995.

D. A. Patterson and J.L. Hennessy, "Computer Architecture: A Quanititative Approach," Morgan Kaufmann, pp. 70–72, 1996.

M.V. Wilkes, "The Best Way to Design an Automatic Calculating Machine," in E. Swartzlander Jr., Computer Design Development: Principle Papers, pp. 266–270, Hayden Book Company, Rochelle Park, New Jersey, 1976.

* cited by examiner

Primary Examiner—Kenneth S. Kim
(74) Attorney, Agent, or Firm—Ryan, Mason & Lewis, LLP

(57) ABSTRACT

A processor is configured to include at least two architecturally-distinct storage spaces, such as, for example, a stack for storing control operands associated with one or more instructions, and a register file for storing computational operands associated with one or more instructions. The processor further includes a datapath which is at least partially shared by the stack and register file, a multiplexer operative to select an output of either the stack or the register file for application to an input of the shared datapath, and a demultiplexer operative to select an output of the shared datapath for application to an input of either the stack or the register file. A program executed by the processor selects one of the storage spaces using, for example, a tag bit associated with a given instruction and indicating which of the storage spaces is to be used with that instruction, or a branch machine view (bmv) instruction which generates a control signal operative to select the given one of the storage spaces.

23 Claims, 4 Drawing Sheets

FIG. 2
PRIOR ART

| Stack Operation | Comments |
|---|---|
| Push @A | Load 32-bit address of operand A to top of stack (TOS) |
| Load | Load 8-bit value A to TOS |
| Push @B | Load 32-bit address of operand B to TOS |
| Load | Load 8-bit value B to TOS |
| Add | Add values A and B, store result at TOS |
| Push @C | Load 32-bit destination address to TOS |
| Store | Store result to memory space at TOS |

FIG. 3
PRIOR ART

| Operation | Comments |
|---|---|
| Move R30, @A | Load the address of A into R30 |
| Load R1, [R30] | Load the contents of the memory address held in R30 into register R1 |
| Move R29, @B | Load the address of B into R29 |
| Load R2, [R29] | Load the contents of the memory address held in R29 into register R2 |
| Add R3, R1, R2 | Add R1 and R2, store result in R3 |
| Move R28, @C | Load destination address into R28 |
| Store [R28], R3 | Store result in R3 to memory space C |

| Tag | Original Instruction |
|---|---|
| 1 | Stack Instruction |

```
label:
        push    @subroutine1;
        jsr;
        push    @subroutine2;
        jsr;
        load    r4, @operand_addr;
        mpy     r7, r5, r6;
        store   @result_addr, r7;
        push    @branch_addr;
        push    @result_addr;
        beq;                        //conditional branch based on register value
```

SHARED DATAPATH PROCESSOR UTILIZING STACK-BASED AND REGISTER-BASED STORAGE SPACES

FIELD OF THE INVENTION

The present invention relates generally to processors, such as microprocessors and digital signal processors (DSPs), and more particularly to techniques which permit such processors to utilize multiple types of architecturally-distinct spaces, such as stack-based and register-based storage spaces.

BACKGROUND OF THE INVENTION

Instruction storage is an important issue in the design of microprocessors, DSPs and other types of processors. In general, instructions may be stored in internal memory, i.e., on-chip memory, or external memory, i.e., off-chip memory. Since instructions stored on-chip are typically accessed more efficiently than those stored off-chip, it is important to store as large a percentage of the instructions on-chip as possible. This issue is particularly important for embedded processors, in which the on-chip memory space is rather limited. For example, the Lucent Technologies Inc. 1600 family of processors, which are often utilized in embedded applications, include about 65 kilobytes of internal memory. Although more recently developed embedded processors can include more than 1 megabyte of on-chip memory, modern wide-issue processors can require as much as ten times this amount of on-chip memory. It is therefore becoming increasingly important to reduce the instruction storage space requirements for processors, particularly for those processors used in embedded applications.

FIG. 1 shows an example of a conventional digital signal processor (DSP) architecture. A processor 10 includes control logic 12, a global memory 14, internal storage 16 and a datapath 18. The control logic 12 is the "glue" of the processor architecture. It coordinates the operation of the other elements by issuing control signals to regulate interaction. The global memory 14 is used to store data and programs. The internal storage 16, which has a substantially faster access time than the global memory 14, is used to store data that is to be processed in accordance with a program currently being run by the processor 10. The datapath 18 manipulates this data and processes the results of arithmetic and logical operations, and will generally include well-known elements such as fetch, decode and execution units. DSP applications executed in the processor 10 will typically include at least two types of instructions: control instructions and DSP inner loop computational instructions. Control instructions generally issue a single operation and can be encoded in relatively small word-length instructions. DSP computational instructions, in contrast, can typically issue multiple operations from a single instruction or provide parallel issue of multiple instructions. A typical dynamic DSP processing application includes about 70% DSP computational code and about 30% control code. Dynamic video processing applications can include up to 90% DSP computational code and only 10% control code. Traditionally, processor designers have reduced the amount of instruction storage required in a DSP architecture by either providing variable length instructions or providing reduced access instructions of fixed width which partition the register files into multiple shared files. See, for example, K. Kissell, "MIPS16: High-Density MIPS for the Embedded Market," In Proceedings of the ACM SIGPLAN Workshop on Languages, Compilers and Tools for Real-Time Systems, Las Vegas, Nev., Jun. 15, 1997.

Processors of the type illustrated in FIG. 1 may be, for example, stack-based or register-based. A stack is an internal storage space which is typically partitioned into words of equal size and follows last-in-first-out (LIFO) operation. The first entry placed on the stack is said to be at the bottom of the stack, and each subsequent entry is placed at the top of the stack. In other words, the stack grows from last entry to first entry. Entries may only be accessed from the top of the stack. Push and pop operations are generally required to add (load) and remove (store) words from the top of the stack. More complex stacks can include special instructions to access words not currently at the top of the stack. It is important to note that in this type of architecture, the operations do not specify the address of the operands on which they operate. Thus, there must exist an implicit ordering of operands in a stack-based architecture. FIG. 2 illustrates the manner in which an addition operation may be carried out in a stack-based processor, using an implicit ordering of operands. In this example, operands A and B are loaded from memory, and the result of their addition is stored in memory at location C. The advantage of a stack-based architecture is that the stack is a simple, easily-implementable structure, which does not require an explicit address in the instruction format to access operands.

In a register-based architecture, operands are loaded from memory and stored in a register file. Unlike stack-based instructions, such as those illustrated in the example of FIG. 2, register-based instructions must specify an explicit address to access operands. In general, operands contained in registers are more accessible than those contained in a stack. FIG. 3 illustrates the manner in which an addition operation may be carried out in a register-based processor. In this example, like the previous example, operands A and B are loaded from memory, and the result of their addition is stored in memory at location C.

As noted previously, the stack-based architecture may be advantageous for certain applications due to its reduced storage requirements. On the other hand, registers can hold variables that may need to be accessed multiple times in a concurrent, nonsequential manner. Register-based instructions may decrease the number of external memory accesses and thus decrease execution time of a program that contains many data accesses. For example, suppose that a compiler for each of a stack-based and a register-based processor is to compile the expression C(AB)+C. The compiler for the register-based processor will have the ability to calculate the individual arithmetic operations in any order, determining the efficiency of each order with respect to data hazards, operand location, etc. For this particular expression, a stack-based architecture may require two memory accesses of the variable C, while a register-based architecture may store the variable C in a register and thus potentially avoid multiple memory accesses.

A number of techniques have been developed which can be used to allow a given processing system to support multiple architectural spaces. One such technique involves the use of a branch-exchange instruction to pass control from one processor to another within the system. The branch-exchange instruction invokes an interrupt on a requesting processor to pass control to the other processor, and control returns back to the requesting processor by a similar mechanism. However, this technique generally does not allow any sharing of dataflow execution units. A related technique which does allow some sharing of execution units has been used in the Delft-Java processor to branch between a Java Virtual Machine view and a RISC-based machine view, as described in greater detail in C. J. Glossner and S.

Vassiliadis, "The Delft-Java Engine: An Introduction," Lecture Notes in Computer Science, Springer-Verlag, Third International Euro-Par Conference (Euro-Par '97 Parallel Processing), pp. 766–770, Passau, Germany, Aug. 26–29, 1997, which is incorporated by reference herein. In the Delft-Java processor, a reserved opcode is used as a branch-exchange instruction to allow control to be passed back and forth between the two views. Another dual machine view technique is implemented in the ARM Thumb processor, as described in ARM 7TDMI Datasheet, Advanced RISC Machines, Ltd., UK, Document No. ARM DDI 0029E, August 1995. However, in this technique the "Thumb" architecture is a subset of the full ARM32 architecture. A similar approach is used in the above-cited MIPS16 reference.

Although the techniques described above can permit a processor to execute multiple architectures, further improvements in code compression and processing efficiency are needed, particularly for embedded processor applications with limited on-chip storage space.

SUMMARY OF THE INVENTION

The present invention discloses a processor which allows different instruction operands to be stored in one of two or more architecturally-distinct storage spaces, such as, e.g., a stack and a register file, such that the processor architecture can support, e.g., both a stack-based architectural space and a register-based architectural space. A processor in accordance with the invention includes a shared datapath which can be selectively coupled to each of the architecturally-distinct storage spaces, such that instructions for each of the spaces may be interspersed within a set of code for the processor. The result is improved performance and a significant reduction in static code size relative to conventional processors.

In an illustrative embodiment of the invention, the processor includes a stack for storing control operands and a register file for storing computational operands. The processor further includes a datapath which is at least partially shared by the stack and register file, a multiplexer operative to select an output of either the stack or the register file for application to an input of the shared datapath, and a demultiplexer operative to select an output of the shared datapath for application to an input of either the stack or the register file. A program executed by the processor selects either the stack or the register file using, for example, a tag bit associated with a given instruction and indicating which of the address spaces is to be used with that instruction, or a branch machine view (bmv) instruction which generates a control signal operative to select either the stack or the register file.

The invention provides a number of advantages over conventional processors. For example, the invention can reduce static code storage requirements by only generating register-based code for critical inner loops, while control threads, which may represent more than seventy percent of the overall static code size for a given program, are targeted for stack-based instructions. Another advantage is the reduction in hardware requirements. Conventional processors with multiple storage spaces generally require multiple datapaths, as is the case with many coprocessor implementations. Furthermore, the invention is able to process code intended for both stack-based and register-based architectures, thereby providing an efficient processor architecture. These and other features and advantages of the present invention will become more apparent from the accompanying drawings and the following detailed description.

BRIEF DESCRIPTION OF THE DRAWINGS

FIGS. 2 and 3 show examples of the implementation of an addition operation in a stack-based architecture and a register-based architecture, respectively.

DETAILED DESCRIPTION OF THE INVENTION

The invention will be illustrated below in conjunction with exemplary processor implementations. It should be understood, however, that the invention is not limited to use with any particular type of processor configuration, but is instead more generally applicable to any processor or processing system in which it is desirable to support both stack-based and register-based execution while also significantly reducing code requirements. Although illustrated using a digital signal processor (DSP) architecture, the invention is applicable to other types of architectures or other instruction set-based configurations, such as, for example, a reduced instruction set computer (RISC) architecture, a complex instruction set computer (CISC) architecture, and other register-based, stack-based, memory-to-memory, or vector-based architectures. The term "processor" as used herein is intended to include any computing device in which instructions retrieved from a memory or other storage device are executed using one or more execution units. Processors in accordance with the invention may therefore include, for example, personal computers, mainframe computers, network computers, workstations, servers, microprocessors, DSPs, application-specific integrated circuits (ASICs), as well as portions and combinations of these and other types of data processors. The terms "architectural space" and "storage space" as used herein refer to any type of memory space associated with a processor, including, for example, a stack or a register file. The term "datapath" as used herein refers generally to a set of execution units, which are utilized to process an instruction. A "shared" datapath refers to a datapath for which at least one element is shared between different storage spaces, such as, for example, a stack and a register file.

The present invention provides a processor architecture which, in an illustrative embodiment, incorporates a stack and a register file as data sources to a shared datapath. The stack is used, for example, to store operands associated with control threads, while operands associated with computational threads are stored in the register file. Communication between these architecturally-distinct storage spaces can take place, for example, through shared memory or special instructions. As will be described in greater detail below, the intended storage space of a given instruction can be specified, for example, through the use of a tag bit, or through the implementation of a branch machine view (bmv) instruction.

Figure 1:
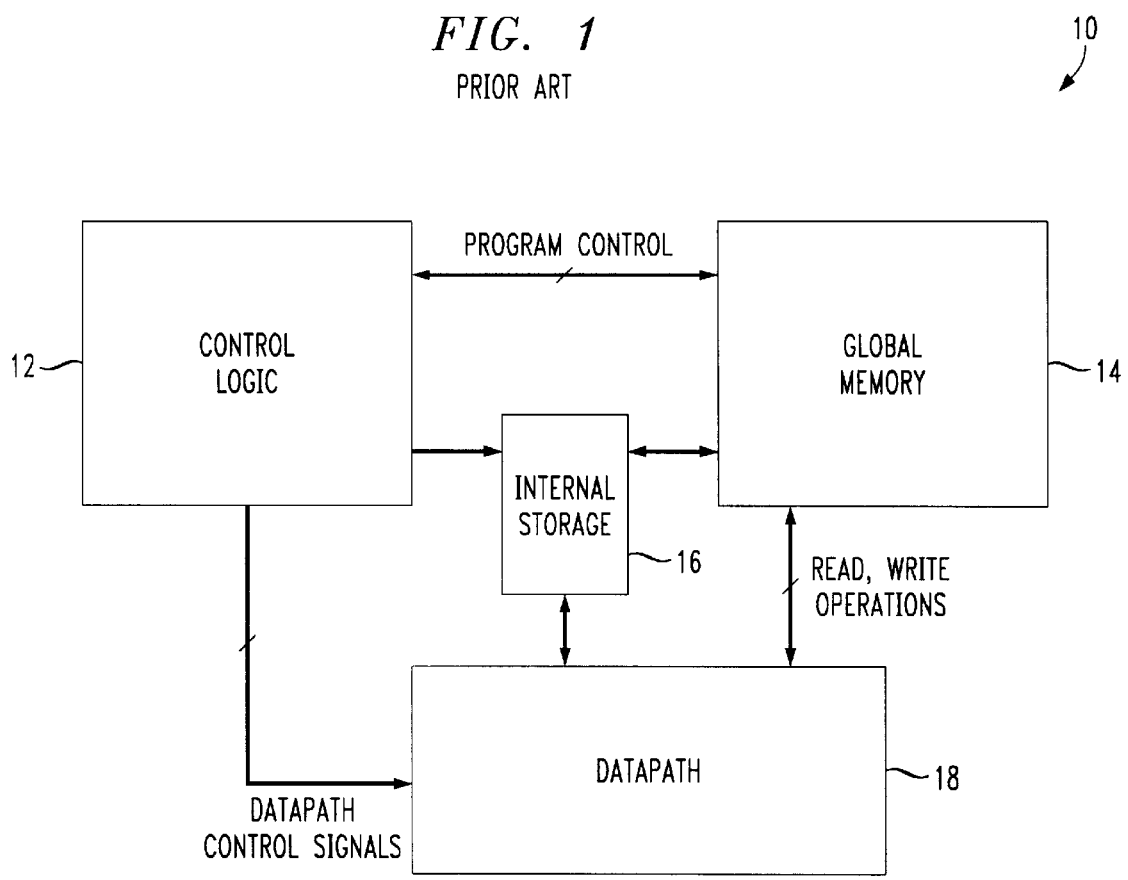
FIG. 1 shows a conventional digital signal processor (DSP) architecture implementation.
Figure 4:
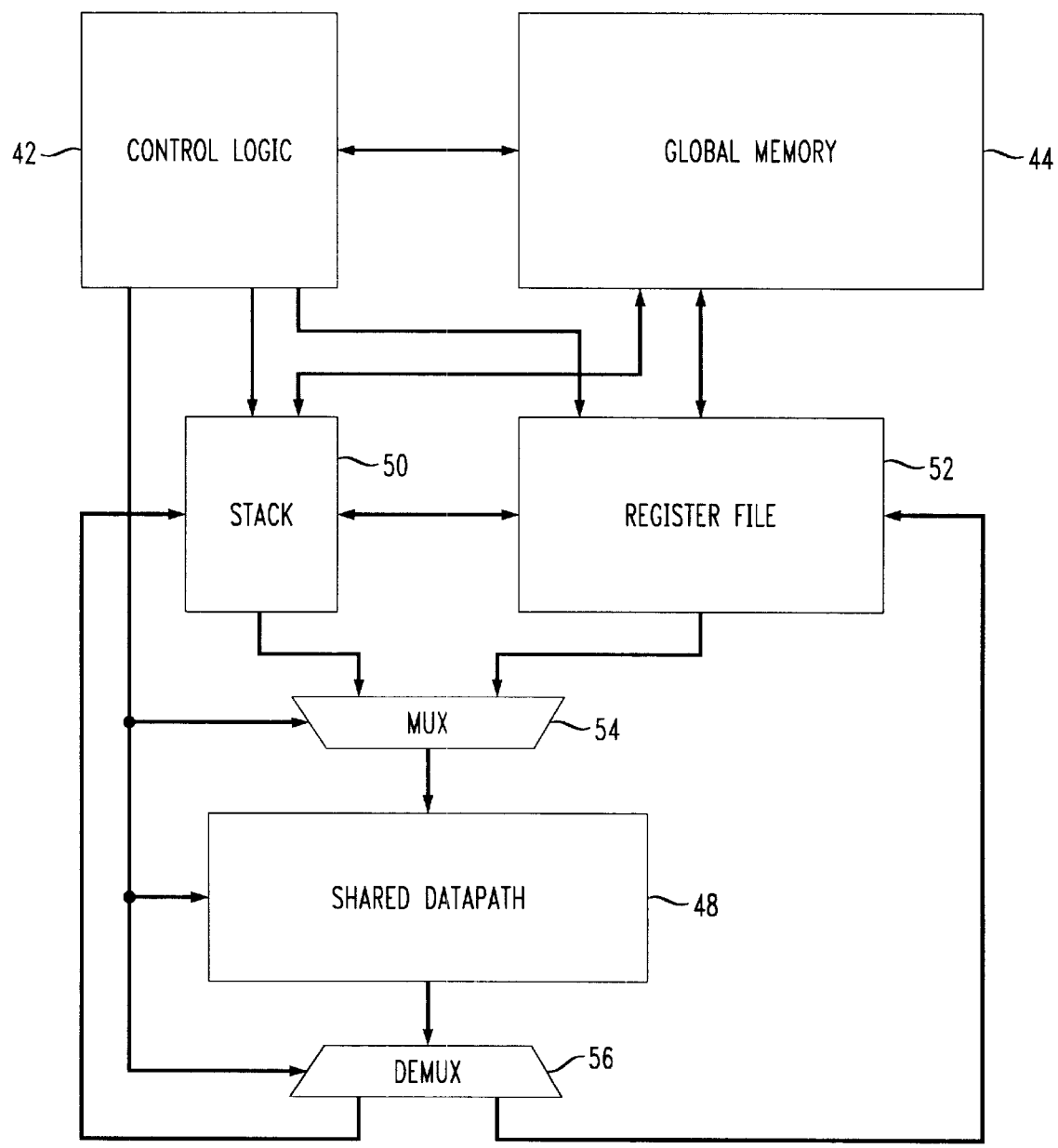
FIG. 4 is a block diagram of a shared-datapath DSP architecture in accordance with an illustrative embodiment of the present invention.

FIG. 4 shows a processor 40 which includes a shared-datapath architecture in accordance with an illustrative embodiment of the invention. The processor 40 includes control logic 42, a global memory 44, and a shared datapath 48. As in the processor 10 of FIG. 1, the control logic 42 of processor 40 coordinates the operation of the other processor elements by issuing control signals to regulate interaction, while the global memory 44 is used to store data and programs. The processor 40 also includes two architecturally-distinct storage spaces: a stack 50 and a register file 52. The stack 50 and register file 52 represent internal storage spaces having substantially faster access times than the global memory 44. In accordance with the invention, the stack 50 is primarily used as a storage space for control operands, while the register file 52 is used to store DSP computational operands.

A multiplexer 54 selects the output of either the stack 50 or the register file 52 for delivery to the input of the shared datapath 48. A demultiplexer 56 delivers the output of the shared datapath 48 to either the stack 50 or the register file 52 as required. One or more control signals supplied from the control logic 42 to the multiplexer 54 and the demultiplexer 56 determine whether the input and output, respectively, of the datapath 48 are coupled to the stack 50 or the register file 52. The control signals thus determine which of the two storage spaces, the stack 50 or the register file 52, is to be used in conjunction with the datapath 48. The same control signal may be used to control both the multiplexer 54 and the demultiplexer 56, such that when the input of the shared datapath is coupled to either the stack 50 or register file 52 via multiplexer 54, the output of the shared datapath 48 is also coupled to the corresponding element via demultiplexer 56. In other embodiments, different control signals may be used to control the states of multiplexer 54 and demultiplexer 56, such that these two elements may be in different states at different times. In a multiple-issue implementation, multiple multiplexers and demultiplexers can be used to determine simultaneously whether the inputs and outputs are coupled to the stack or the register file for each instruction issued at a given time. Techniques for generating suitable control signals for use in processor 40 will be described in greater detail in conjunction with FIGS. 6 and 7 below.

As noted above, DSP instructions generally include at least two types of instructions: control instructions and DSP inner loop computational instructions. Control instructions generally issue a single operation and can be encoded in relatively small word-length instructions. DSP instructions, in contrast, can typically issue multiple operations from a single instruction or provide parallel issue of multiple instructions. Since control instructions typically do not need to issue in parallel, the reduced instruction storage requirements of a stack make it well-suited for use with control instructions. Unlike a control instruction, a DSP computational thread may require multiple issue operations. A register file is therefore an efficient storage mechanism for this type of instruction. Since a stack-based architecture generally requires a shorter instruction word length than a register-based architecture, separating the two spaces and using a different word length in each, or using multiple packed instructions within a given fixed wordlength, will significantly reduce the overall static code size.

Figures 5, 6, 7:
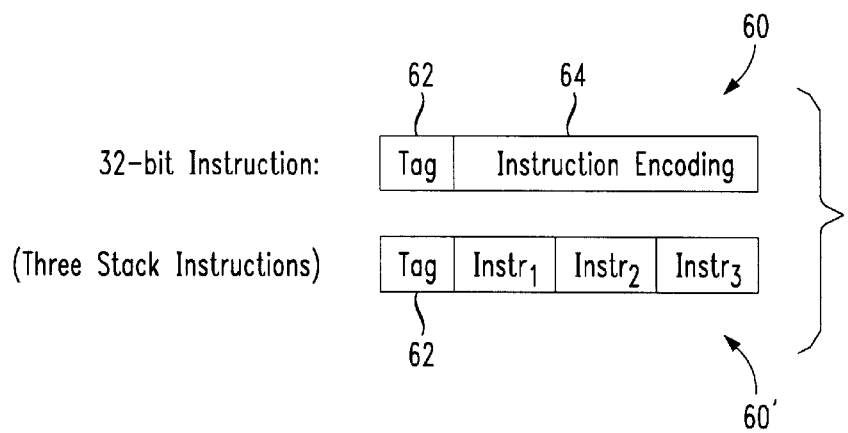
FIG. 5 illustrates instruction packing for encoding multiple stack instructions into a single register, in accordance with the invention.
FIG. 6 shows the implementation of a stack instruction using a tag bit technique in accordance with the invention.
FIG. 7 illustrates the handling of stack-based and register-based instructions using a tag bit technique in accordance with the invention.

FIG. 5 illustrates the manner in which multiple instructions can be packed into a fixed wordlength in accordance with the invention. In this example, a register 60 includes a tag 62 and an instruction coding 64. The same instruction can be configured as shown at 60' to include tag 62 and three stack instructions $Instr_1$, $Instr_2$ and $Instr_3$. The three stack instructions are thus encoded into a single instruction.

The stack 50 of FIG. 4 may be implemented as a memory cache, or may be physically limited to a fixed number of entries, e.g., 32 entries. This allows the stack 50 to be implemented using substantially the same logic circuits as a conventional register file. Each cache entry may include a valid bit and a "dirty" bit. The valid bit is used to signify whether a given block of data is occupied by the current entry. The dirty bit denotes whether or not the cache entry has been altered since its initial access. This decreases the number of memory writes by not writing entries without a set dirty bit back to memory. Of course, other suitable configurations could also be used for the stack 50. It should also be noted that data may be transmittable between the stack 50 and the register file 52, for example, through shared memory or direct transfer. In the latter case, an instruction may be required for implementing the transfer.

FIG. 6 illustrates one possible technique for controlling the selection of either the stack 50 or the register file 52 in the processor 40 of FIG. 4. In this technique, the intended architectural space for a particular operand, and thus the control signal for the multiplexer 54, is specified using a tag bit in each instruction. For example, as shown in FIG. 6, the tag bit may be set to a logic "one" for stack-based operands or to a logic "zero" for register-based operands. An advantage of this technique is that stack-based and register-based instructions can be freely intermixed. In the processor of FIG. 4, such a tag bit can be used directly as the control signal for the multiplexer 54 and the demultiplexer 56. Datapath components may also require access to this tag bit in order to route instruction results appropriately. FIG. 7 shows a set of code illustrating the use of the tag bit technique. Note that the code context may be used to avoid specifying individual instructions as "stack" or "register" instructions. For example, the jsr instructions in the FIG. 7 code are assumed to be stack-based, since there are no explicitly-specified operands for these instructions. A register-based jsr instruction is implied if the instruction explicitly specifies a target address. In the example of FIG. 7, the processor executes the first four instructions as stack-based instructions, the next three as register-based instructions, and the remaining instructions as stack-based instructions. The intended architectural space is implied by the syntax of each instruction.

Multiple machine view execution may also be used for controlling the selection of either the stack 50 or the register file 52 in the processor 40 of FIG. 4. This technique treats execution within each architectural space as a separate machine view, as described in greater detail in U.S. patent application Ser. No. 09/052,671 filed Mar. 31, 1998 in the name of inventors Paul G. D'Arcy et al. and entitled "Multiple Machine View Execution in a Computer System," which is incorporated by reference herein. In one possible implementation of this technique in the processor 40 of FIG. 4, instruction set architectures (ISAs) for a stack-based machine view and a register-based machine view each include an instruction that branches from the current ISA machine view to the other. Such an instruction is referred to in the above-cited U.S. patent application as a branch machine view (bmv) instruction. In this type of implementation of processor 40, communication between the architectural spaces may take place through shared memory. In an embodiment using multiple machine view execution, the bmv instruction may be used to invoke a control signal that toggles the output of multiplexer 54 to the previously unselected input. Again, it may be necessary to make this control signal accessible to datapath components in order to ensure accurate processing.

The embodiments of the present invention described above may be configured to meet the requirements of a variety of different computing applications and environments, using any desired set of architectures. The above-described embodiments of the invention are therefore intended to be illustrative only. In alternative embodiments, a processor may include more than two different architectural spaces, such as, for example, two different types of stacks and a register file, with a datapath at least partially shared by all three. These and numerous alternative embodiments within the scope of the following claims will be apparent to those skilled in the art.

What is claimed is:

1. A processor comprising:
   a first stack-based storage space configured to store control operands associated with one or more of a plurality of instructions;
   a second register-based storage space configured to store computational operands associated with one or more of the plurality of instructions; and
   a datapath which is at least partially shared by the first and second storage spaces, such that data from both the first and the second storage spaces can be processed through at least a portion of the datapath under control of a program including at least a subset of the plurality of instructions.

2. The processor of claim 1 wherein the first and second storage spaces are part of an internal memory of the processor.

3. The processor of claim 1 wherein the first and second storage spaces are architecturally-distinct spaces, and wherein one of the storage spaces utilizes a shorter instruction word length than the other space.

4. The processor of claim 1 wherein the first storage space is a stack and the second storage space is a register file.

5. The processor of claim 4 further including a multiplexer operative to select an output of one of the stack and the register file for application to an input of the shared datapath.

6. The processor of claim 4 further including a demultiplexer operative to select an output of the shared datapath for application to an input of one of the stack and the register file.

7. The processor of claim 1 wherein the processor is a digital signal processor (DSP) and the computational operands include DSP inner loop computational operands.

8. The processor of claim 4 wherein a plurality of stack instructions used with the stack are associated with a single register instruction, such that both the stack and the register file effectively utilize a common fixed word length.

9. The processor of claim 1 wherein the program selects a given one of the storage spaces for use at a given time using a tag bit associated with a given one of the instructions, with a value of the tag bit indicating which of the storage spaces is to be used with the given instruction.

10. The processor of claim 1 wherein the program selects a given one of the storage spaces for use at a given time using a branch instruction which generates a control signal operative to select the given one of the storage spaces.

11. A method for use in a processor, the method comprising the steps of:
    storing in a first stack-based storage space control operands associated with one or more of a plurality of instructions;
    storing in a second register-based storage space computational operands associated with one or more of the plurality of instructions; and
    processing data from both the first and the second storage spaces through a datapath under control of a program including at least a subset of the plurality of instructions, such that at least a portion of the datapath is shared by the first and second storage spaces.

12. The method of claim 11 wherein the first storage space is a stack and the second storage space is a register file.

13. The method of claim 12 further including the step of selecting an output of one of the stack and the register file for application to an input of the shared datapath.

14. The method of claim 12 further including the step of selecting an output of the shared datapath for application to an input of one of the stack and the register file.

15. The method of claim 12 further including the step of associating a plurality of stack instructions, used with the stack, with a single register instruction, such that both the stack and the register file effectively utilize a common fixed word length.

16. The method of claim 11 further including the step of selecting a given one of the storage spaces for use at a given time using a tag bit associated with a given one of the instructions, wherein a value of the tag bit indicates which of the storage spaces is to be used with the given instruction.

17. The method of claim 11 further including the step of selecting a given one of the storage spaces for use at a given time using a branch instruction which generates a control signal operative to select the given one of the storage spaces.

18. A processor comprising:
    at least first and second architecturally-distinct storage spaces the first storage space comprising a stack-based storage space and the second storage space comprising a register-based storage space, wherein the stack-based storage space utilizes a shorter instruction word length than the register-based storage space; and
    a datapath at least a portion of which is selectively couplable to each of the first and second storage spaces.

19. The processor of claim 18 wherein the first storage space is a stack and the second storage space is a register file.

20. The processor of claim 18 wherein the first storage space stores control operands for one or more of a plurality of instructions, and the second storage space stores computational operands for one or more of the plurality of instructions.

21. A processor comprising:
    a first storage space configured to store control operands associated with one or more of a plurality of instructions;
    a second storage space configured to store computational operands associated with one or more of the plurality of instructions; and
    a datapath which is at least partially shared by the first and second storage spaces, such that data from both the first and the second storage spaces can be processed through at least a portion of the datapath under control of a program including at least a subset of the plurality of instructions, wherein the program selects a given one of the storage spaces for use at a given time using a branch instruction which generates a control signal operative to select the given one of the storage spaces.

22. A method for use in a processor, the method comprising the steps of:

storing in a first storage space control operands associated with one or more of a plurality of instructions;

storing in a second storage space computational operands associated with one or more of the plurality of instructions;

processing data from both the first and the second storage spaces through a datapath under control of a program including at least a subset of the plurality of instructions, such that at least a portion of the datapath is shared by the first and second storage spaces; and selecting a given one of the storage spaces for use at a given time using a branch instruction which generates a control signal operative to select the given one of the storage spaces.

23. A processor comprising:

at least first and second architecturally-distinct storage spaces, wherein one of the storage spaces utilizes a shorter instruction word length than the other; and a datapath at least a portion of which is selectively couplable to each of the first and second storage spaces under control of a program including one or more instructions, wherein the program selects a given one of the storage spaces for use at a given time using a branch instruction which generates a control signal operative to select the given one of the storage spaces.

* * * * *